United States Patent [19]

Kando

[11] Patent Number: 4,720,728
[45] Date of Patent: Jan. 19, 1988

[54] IMAGE FORMING APPARATUS AND SHEET RECEPTACLE FOR USE THEREWITH

[75] Inventor: Masahiro Kando, Tokyo, Japan
[73] Assignee: Canon Kabushiki Kaisha, Tokyo, Japan
[21] Appl. No.: 907,156
[22] Filed: Sep. 15, 1986

Related U.S. Application Data

[63] Continuation of Ser. No. 672,673, Nov. 19, 1984, abandoned.

[30] Foreign Application Priority Data

Nov. 25, 1983 [JP] Japan .................................. 58-222619

[51] Int. Cl.⁴ ............................................. G03G 15/00
[52] U.S. Cl. .................... 355/35 H; 271/209
[58] Field of Search ............... 355/3 R, 35 H, 72, 75, 355/133; 271/65, 207, 209

[56] References Cited

U.S. PATENT DOCUMENTS

| | | | |
|---|---|---|---|
| 3,700,231 | 10/1972 | Aasen et al. | 271/65 X |
| 3,807,726 | 4/1974 | Hope et al. | 271/207 |
| 4,262,895 | 4/1981 | Wenthe, Jr. | 271/65 |
| 4,397,541 | 8/1983 | Lopata et al. | 355/3 R X |
| 4,560,157 | 12/1985 | Hirschberg | 271/209 X |

FOREIGN PATENT DOCUMENTS

| | | |
|---|---|---|
| 0030069 | 6/1981 | European Pat. Off. . |
| 0034269 | 8/1981 | European Pat. Off. . |
| 0096920 | 12/1983 | European Pat. Off. . |
| 710336 | 6/1954 | United Kingdom . |
| 1487954 | 10/1977 | United Kingdom . |
| 1566135 | 4/1980 | United Kingdom . |
| 2099796 | 12/1982 | United Kingdom . |
| 2126992 | 4/1984 | United Kingdom . |
| 2126998 | 4/1984 | United Kingdom . |

Primary Examiner—Arthur T. Grimley
Assistant Examiner—J. Pendegrass
Attorney, Agent, or Firm—Fitzpatrick, Cella, Harper & Scinto

[57] ABSTRACT

The invention provides an improvement in operability in handling sheets such as originals or recording paper. A sheet exhaust receptacle of the invention inverts a sheet exhausted from a convey device in a direction opposite to the exhaust direction and guides the leading end of the sheet to an insertion side of the convey device. Handling of exhausted sheets is easy and the overall apparatus can be rendered compact in size.

7 Claims, 8 Drawing Figures

IMAGE FORMING APPARATUS AND SHEET RECEPTACLE FOR USE THEREWITH

This application is a continuation of application Ser. No. 672,673, filed Nov. 19, 1984, now abandoned.

BACKGROUND OF THE INVENTION

1. Field of the Invention

The present invention relates to a sheet exhaust receptacle for exhausting sheets such as originals or recording papers and to an image formation apparatus using this receptacle.

2. Description of the Prior Art

In a facsimile system or a copying machine, image information having been recorded on an original is recorded on a recording paper sheet through a process of communication or transfer. In such a case, at least one of the original and the recording paper is conveyed in a predetermined direction by a convey means.

Such an apparatus has insertion and exhaust ports for inserting or exhausting the original and recording paper (these will both be referred to as sheets hereinafter).

However, if such insertion and exhaust ports are arranged at a side of the apparatus, operability in insertion and exhaustion of the sheets is poor. When, for example, sheets are exhausted, they may be scattered on a floor. In order to prevent this problem, an exhaust receptacle is conventionally arranged at the exhaust port. However, in this case, the area (floor area) occupied by the overall apparatus is increased, and the apparatus becomes bulky.

The operability of the insertion of originals is good, whilst that of exhausting recording papers is poor, because the exhausting direction of the sheets is fixed.

SUMMARY OF THE INVENTION

It is an object of the present invention to provide a receptacle which does not render an apparatus bulky and improves operability in both the insertion and exhaustion of sheets.

In a receptacle according to the present invention, a sheet conveyed from an exhaust port of a sheet convey apparatus is guided along a curved surface of the receptacle, so that the leading end of the sheet may be guided in a direction opposite to the feeding direction of the sheet, and thereafter the sheet may be supported by the receptacle. This receptacle is mounted at the exhaust port of the convey apparatus. Then, the leading end of a sheet returns to the convey apparatus so that removal of the sheet becomes easy. When this receptacle is positioned within a plane of projection from a position above the apparatus housing, the function of the exhaust receptacle can be performed effectively and the apparatus housing can be rendered compact.

DETAILED DESCRIPTION OF THE PREFERRED EMBODIMENTS

Figure 1:
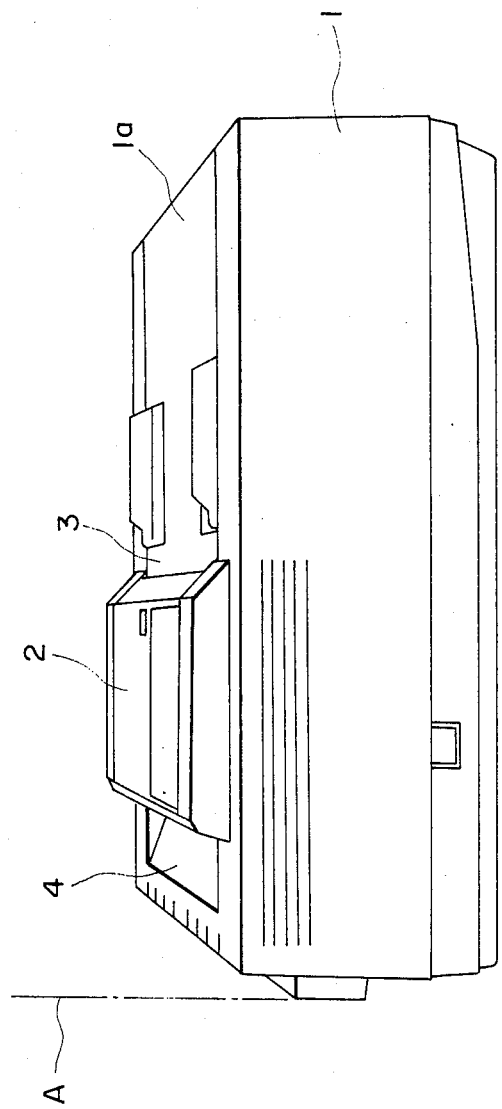
FIG. 1 is a perspective front view showing an example of a facsimile system to which the present invention can be applied.

The present invention will now be described with reference to an embodiment illustrated in the accompanying drawings. FIG. 1 is a perspective view of a facsimile system to which a sheet exhaust apparatus according to the present invention can be applied.

Referring to FIG. 1, a sheet convey section 2 with an exhaust port 4 is arranged on an upper surface 1a of a facsimile system housing 1. A side end position A is at an exhaust side of the housing 1.

A sheet (not shown) inserted in an insertion port 3 is conveyed to the left by the convey section 2 and is exhausted through the exhaust port 4. A conventional exhaust tray 5 or an exhaust receptacle 6 according to the present invention shown in FIG. 2A or 2B, respectively, can be selectively mounted at the exhaust port 4. That is, the receptacle 5 or 6 can be detachably mounted at the exhaust port 4.

Figure 2B:
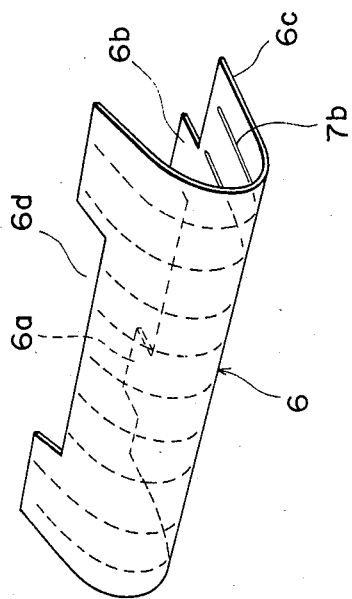
FIG. 2B is a perspective view of a receptacle according to the present invention.
Figure 2A:
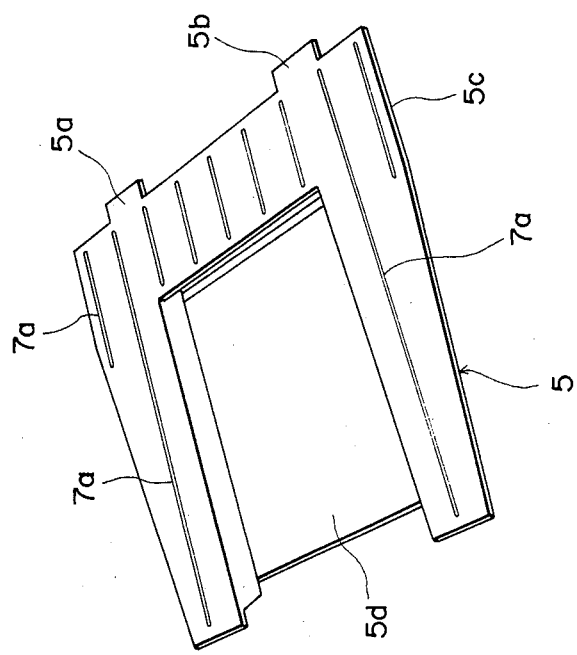
FIG. 2A is a perspective view of a conventional receptacle.

Referring to FIG. 2A, projections 5a and 5b that fit with grooves in the exhaust port 4 are formed at the right end of the receptacle 5. A proximal portion 5c which abuts against a base of the exhaust port 4 is also formed in the receptacle 5. A recess 5d is recessed to a level lower than the upper surface (surfaces of the projections 5a and 5b and of the proximal portion 5c) of the receptacle 5. An instruction manual or the like of the facsimile system can be inserted in this recess 5d. The instruction manual inserted in this recess 5d will not interfere with the exhaustion of the sheets. A plurality of protruded rails 7a are formed on the upper surface of the receptacle 5 so as to prevent the sheet (not shown) to be exhausted from adhering to the upper surface of the receptacle 5. The rails 7a may be made of the same material as that of the receptacle 5 so as to be integral therewith.

Referring to FIG. 2B, projections 6a and 6b that fit with grooves of the exhaust port 4 are formed at the right end of the receptacle 6. A proximal portion 6c which abuts with the base of the exhaust port 4 is also formed in the receptacle 6. A notch 6d is formed in the receptacle 6 to allow easy removal of the exhausted sheet. With this receptacle, the sheet is guided along the inner surface of the receptacle 6 from the lower right portion to the upper left portion, in an inverted direction, and removed from the upper right portion. The notch 6d is thus formed to allow easy gripping of the central portion of the leading end of the sheet.

A plurality of rails 7b corresponding to the rails 7a are formed on the inner surface of the receptacle 6 and also serve to prevent the sheet (not shown) from adhering to the inner surface of the receptacle 6. Note also that the rails 7b may be made of the same material as that of the receptacle 6 and may be formed integrally therewith. When the receptacle 6 is made of a transparent or transluscent material (plastic or the like), the state of the sheet being guided within the tray can be observed through the receptacle 6.

Figure 3:
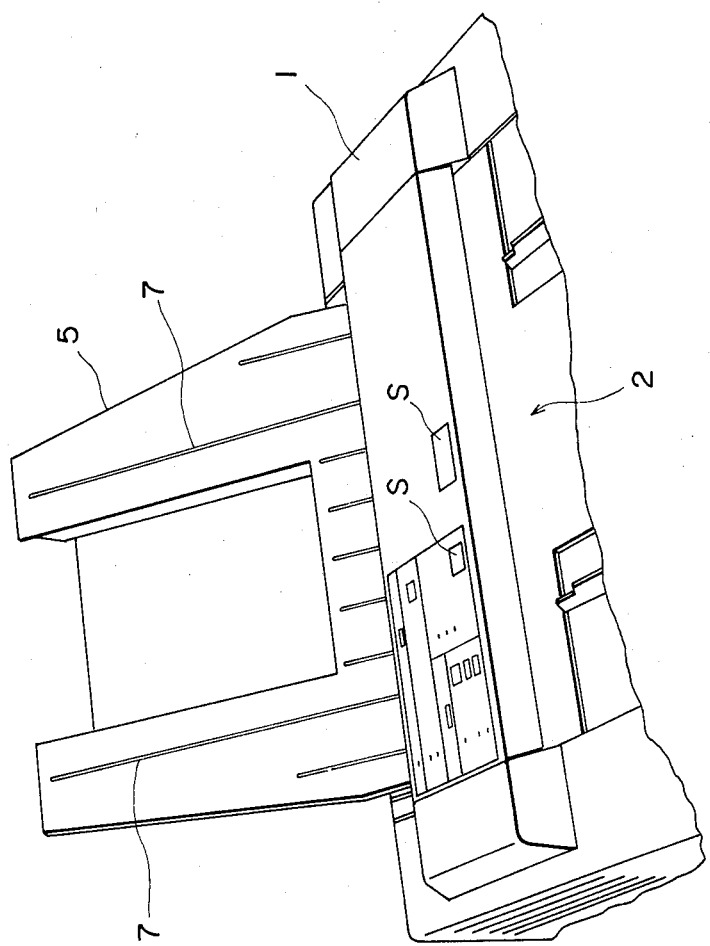
FIG. 3 is a partial perspective view when a conventional receptacle is mounted.
Figure 4:
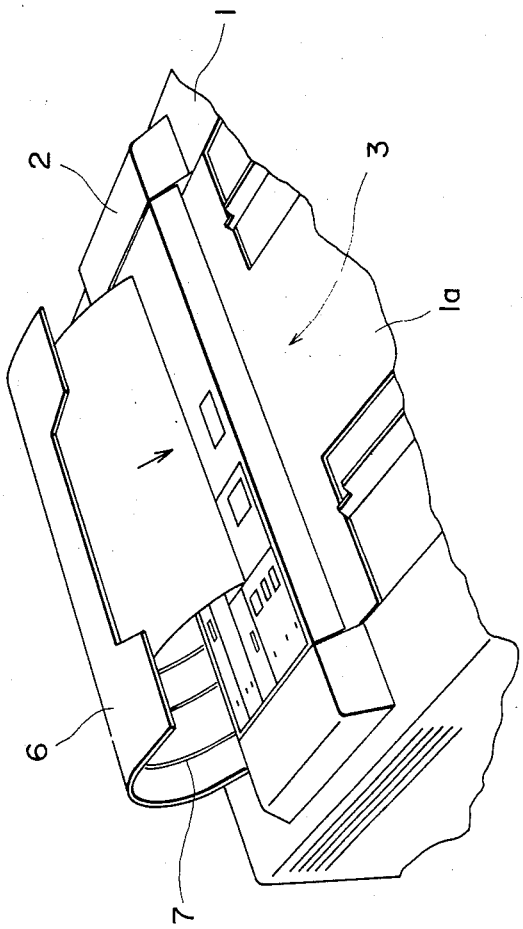
FIG. 4 is a partial perspective view when a receptacle of the present invention is mounted.

FIG. 3 is a perspective view of the conventional receptacle 5 shown in FIG. 2A mounted on a facsimile system. FIG. 4 is a perspective view of the receptacle 6 of the present invention shown in FIG. 2B mounted at the exhaust port 4 shown in FIG. 1. Referring to FIGS. 3 and 4, the same reference numerals as those in FIGS. 1, 2A and 2B denote the same parts. The same applies to FIG. 5 which will be described later.

Figure 5:
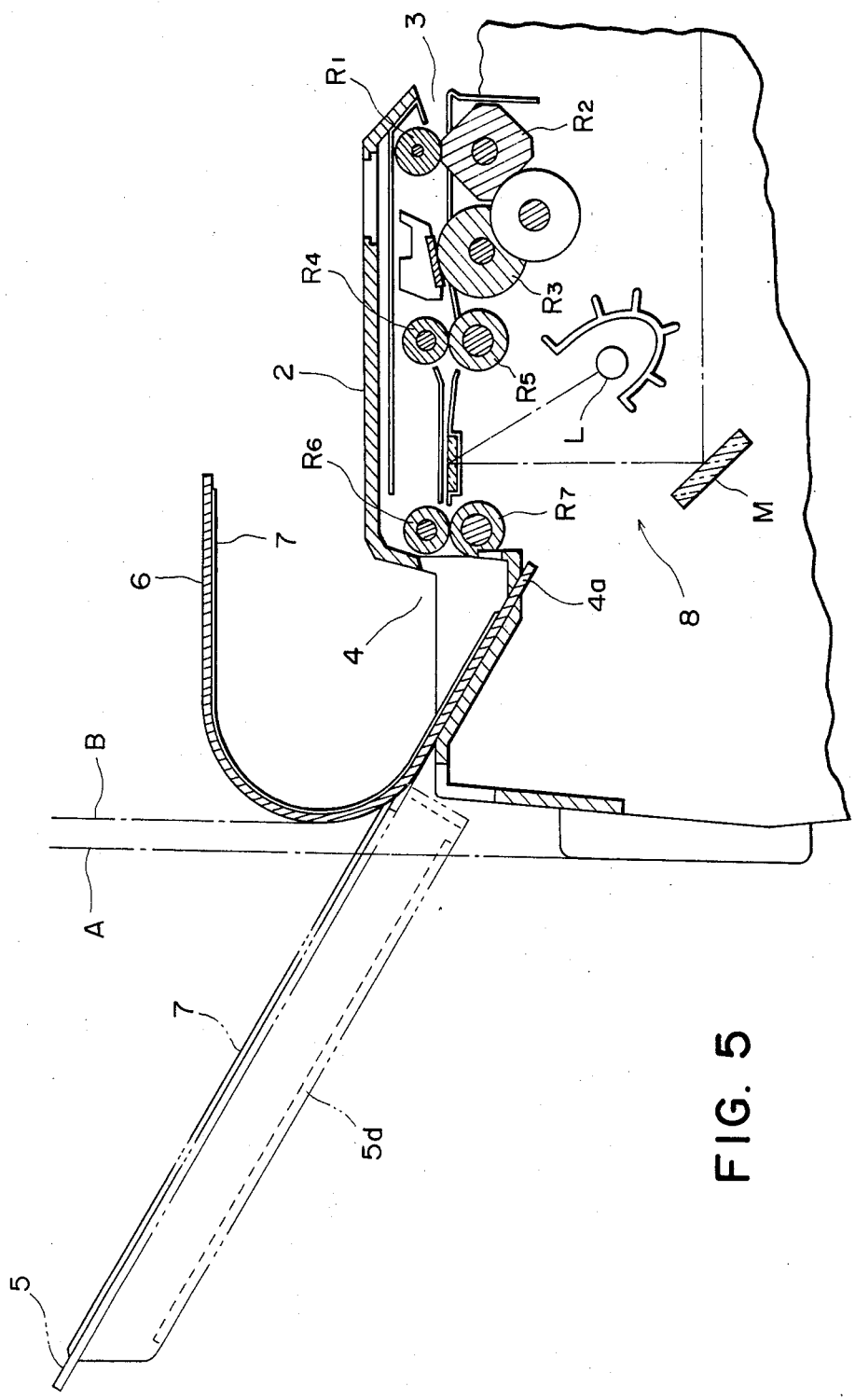
FIGS. 5 and 7 are sectional views of a main part of an apparatus when the receptacle of the present invention is mounted thereon.

FIG. 5 is an enlarged side view showing the inside of the convey portion 2 in FIG. 1.

Referring to FIG. 5, one or a plurality of sheets inserted in the insertion port 3 are conveyed into the convey portion 2 through a pair of rollers $R_1$ and $R_2$, individually conveyed to the left by a roller $R_3$ and a pair of rollers $R_4$ and $R_5$, and are exhausted toward the exhaust port 4 through a pair of rollers $R_6$ and $R_7$. Grooves 4a corresponding to the projections 6a and 6b of the receptacle 6 shown in FIG. 2B are formed in the exhaust port 4 for engaging with these projections 6a and 6b. The lower portion of the proximal portion 5c or 6c shown in FIG. 2A or 2B abuts against the upper surface of the proximal portion of the exhaust port 4. Therefore, the receptacle 5 or 6 can be detachably mounted at the exhaust port 4.

The exhaust port 4 is arranged at the upper surface of the housing 1. A left end B of the receptacle 6 locates at the right side (at the side of the housing) of the side end portion A (upper right portion in FIG. 5). Thus, the area (floor area) occupied by the apparatus including the receptacle 6 can be kept compact. The overall apparatus can be rendered compact in size.

The convey direction of the sheet (not shown) exhausted using the tray 6 changes from the left direction to the upward direction at the curved left end of the receptacle 6, where the sheet is inverted to the right, and rides over the upper surface of the convey portion 2. Then, the leading end of the sheet is returned to a position near the insertion port 3.

Insertion or removal of the sheet can be performed in the vicinity of the ports, so that removal of the sheet is easily facilitated and operability is improved.

Referring to FIG. 5, an operation panel including switches SP for driving the overall apparatus as shown in FIG. 3 or 4 is arranged at the upper portion of the convey portion 2. An optical system 8 for reading character information of a sheet is arranged at the lower portion of the convey portion 2. A lamp L and a reflection mirror M are mounted inside the housing 1.

The setting of the shape of the receptacle 6 will be described hereinafter. As in the case of this embodiment, when the apparatus is a facsimile system or an electrophotographic copying machine, a sheet to be handled is an original or document. Such sheets have various properties or thicknesses and therefore have different flexibilities in accordance with temperature or humidity. In order to convey sheets reliably under these circumstances, a radius of curvature r of the receptacle 6 for inverting the sheet must be properly set, as shown in FIG. 6.

In order to determine an optimal value of the radius of curvature r, sheets of normal paper having varying thicknesses within a range of about 50 to 150 $\mu$m were conveyed in an ordinary office environment. The paper sheet sizes were 210×297 mm and 257×364 mm and were conveyed along their longitudinal direction. As a result of this experiment, the optimal value of the radius of curvature r was determined to be 25 to 40 mm and was preferably about 30 mm. When the radius of curvature r was smaller than this, sheets cannot be conveyed smoothly; they were not inverted or conveyed with a ramp. Conversely, when the radius of curvature r was larger than this value, the leading end of the inverted sheet fell over from its own weight and was conveyed together with its trailing end. Thus, a successful inversion of the sheet cannot be performed.

Figure 6:
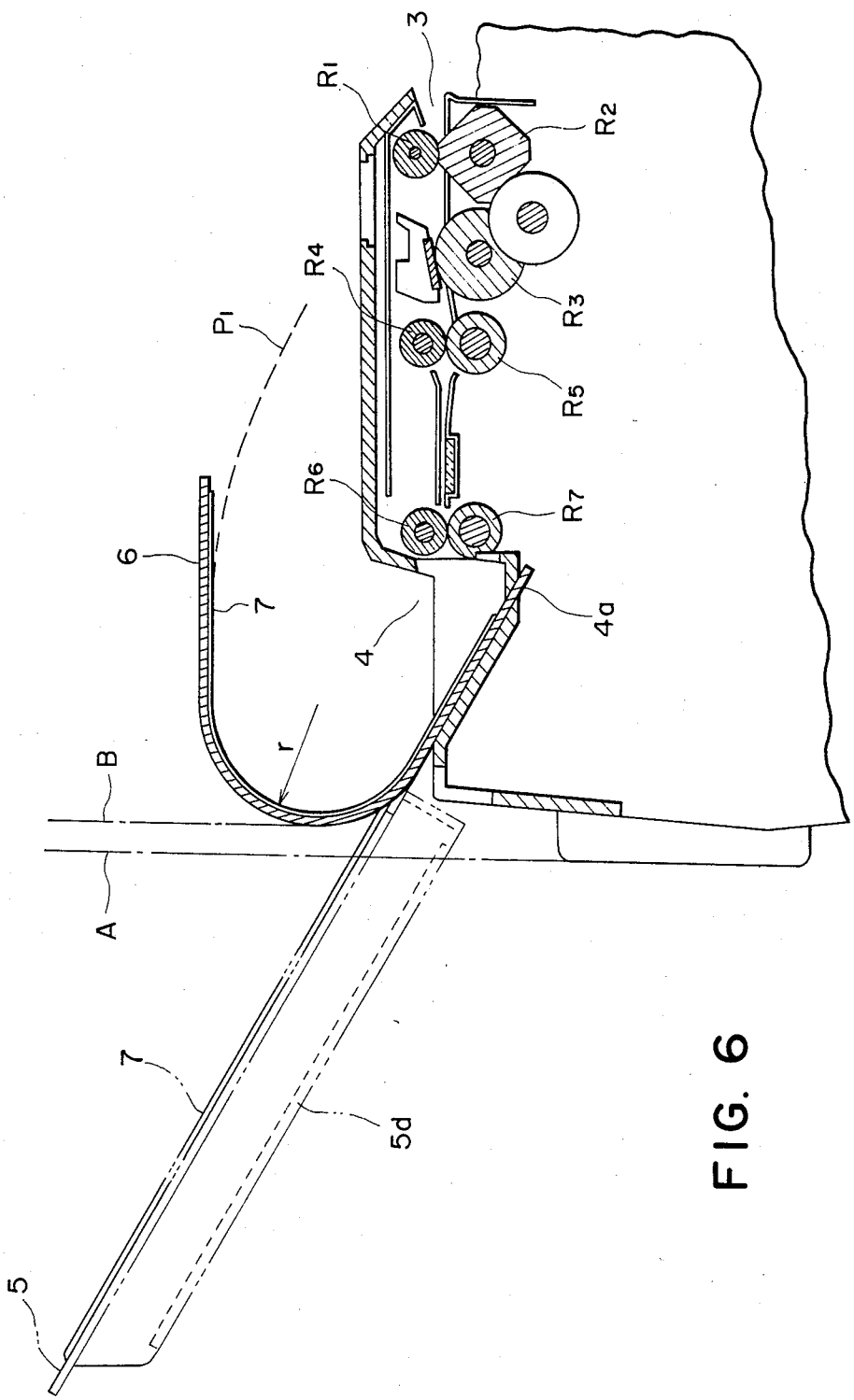
FIG. 6 is a view showing the convey state of a sheet according to the present invention.

When the radius of curvature r falls within the range prescribed above, the sheet is exhausted as indicated by $P_1$ in FIG. 6. The leading end of the sheet is suspended by its own weight. The upper surface of the convey portion 2 then serves to receive and retain the sheet, thereby allowing stable exhaustion of the sheet.

According to a modification of the present invention, a means for conveying a sheet can be arranged at a position between the ends of the tray 6.

Figure 7:
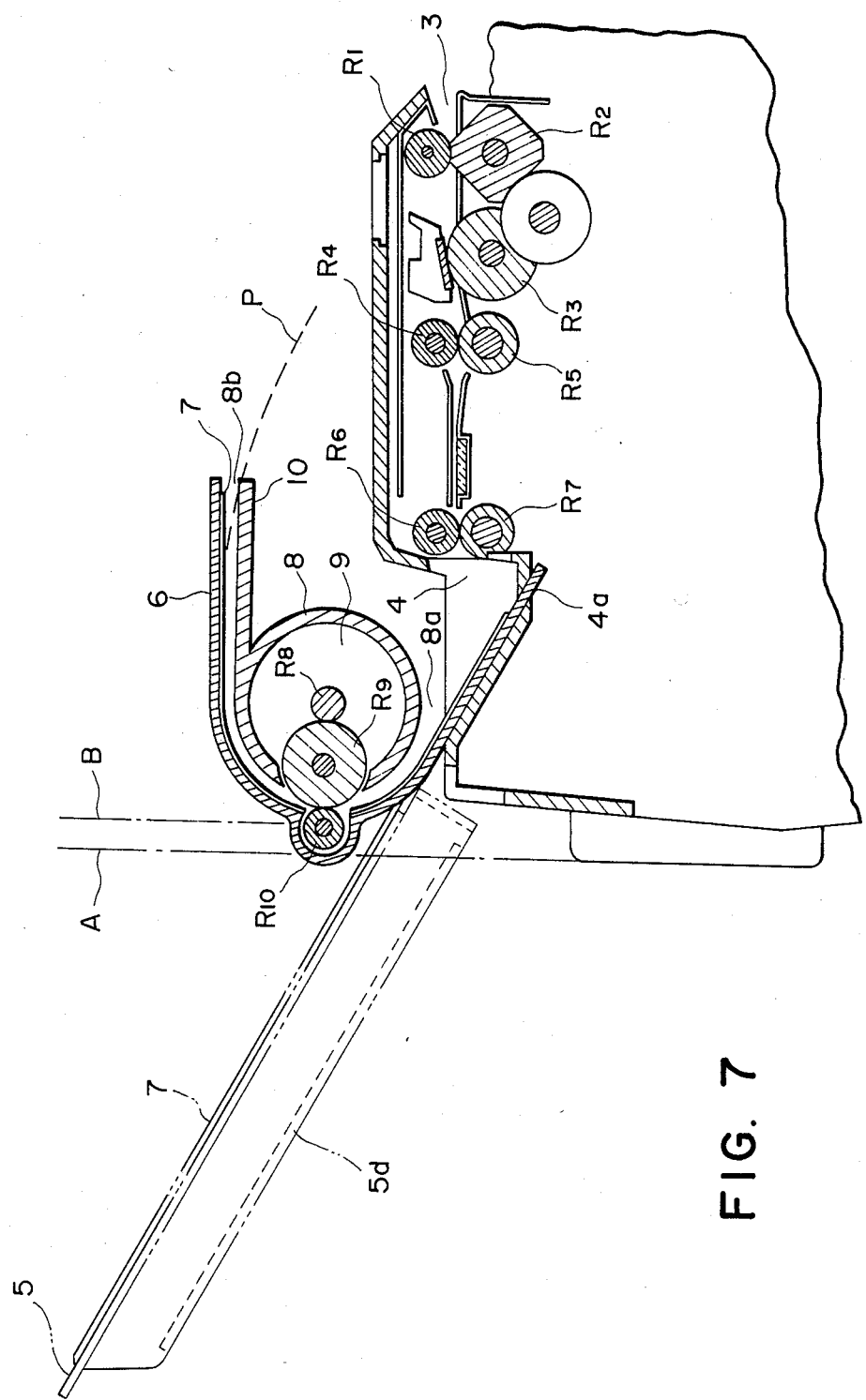

FIG. 7 is a sectional view of a receptacle having such a convey means. Referring to FIG. 7, a motor 9 is mounted inside a support 8 which is formed integrally with the receptacle 6. The support 8 has an insertion port 8a and an exhaust port 8b and, if necessary, an auxiliary receptacle 10.

With the receptacle 6 having the above construction, a sheet conveyed by the pair of rollers $R_6$ and $R_7$ passes through the exhaust port 4, reaches the insertion port 8a, and is conveyed by a pair of rollers $R_9$ and $R_{10}$ driven by a roller $R_8$ mounted on a rotating shaft of the motor 9. When the distance between the pair of rollers $R_6$ and $R_7$ and the pair of rollers $R_9$ and $R_{10}$ is set to be sufficiently smaller than a minimum size of a sheet to be conveyed, the leading end of the sheet can be conveyed by the pair of rollers $R_9$ and $R_{10}$ before exhaustion by the pair of rollers $R_6$ and $R_7$ is completed. Therefore, the pairs of rollers $R_6$ and $R_7$ and $R_9$ and $R_{10}$ are synchronized with each other so that slackening or pulling of the sheet is prevented. The sheet conveyed by the pair of rollers $R_9$ and $R_{10}$ passes through a gap between an external tray 7 and the internal tray 10 and is exhausted through the exhaust port 8b.

As described above, when a forced convey means is arranged inside the receptacle, a sheet of small size can be reliably conveyed to the exhaust port and convey trouble is prevented by the synchronization of the exhaust rollers.

What is claimed is:

1. An image formation apparatus having a sheet conveying mechanism, comprising:
    an apparatus main body having means for forming an image;
    a sheet conveying portion provided on a portion of said main body; and
    a receptacle disposed next to an exhaust side of said sheet conveying portion, said receptacle having a radius of curvature such that a sheet, as it is conveyed through an exhaust port of said sheet conveying portion, is ascended while being turned by said receptacle so as to direct the front end of the sheet toward the main body and said receptacle supports the sheet stationarily in a curved state by a resilient force of the sheet after the rear end of the sheet has left the exhaust port so as to become free.

2. An apparatus according to claim 1, wherein said sheet conveying portion has an upper cover which also serves as a guide surface for the exhausted sheet.

3. An apparatus according to claim 1, wherein said receptacle is located on the upper surface of said main body and the extent of said receptacle is limited by a plane defined by the side of said main body which is adjacent to the exhaust side of said sheet conveying portion.

4. A sheet conveying mechanism comprising:
    a conveying roller for conveying sheets in series;

a sheet exhaust port located at an end portion of said sheet conveying mechanism; and a receptacle having a radius of curvature such that a sheet, as it is conveyed through said exhaust port, is ascended while being turned by said receptacle so as to direct the front end of the sheet toward the main body and said receptacle supports the sheet stationarily in a curved state by a resilient force of the sheet after the rear end of the sheet has left said exhaust port so as to become free.

5. A mechanism according to claim 4, wherein said sheet conveying mechanism has an upper cover which also serves as a guide surface for the exhaust sheet.

6. An image formation apparatus having a sheet conveying mechanism, comprising:

an apparatus main body having means for forming an image;

a sheet conveying portion provided on a portion of said main body; and a receptacle disposed next to an exhaust side of said sheet conveying portion, said receptacle having a radius of curvature of 25 to 40 mm and preferably 30 mm such that a sheet, as it is conveyed through an exhaust port of said sheet conveying portion, is ascended while being turned by said receptacle so as to direct the front end of the sheet toward the main body and said receptacle supports the sheet stationarily in a curved state by a resilient force of the sheet after the rear end of the sheet has left the exhaust port so as to become free.

7. A sheet conveying mechanism comprising:

a conveying roller for conveying sheets in series;

a sheet exhaust port located at an end portion of said sheet conveying mechanism; and a receptacle having a radius of curvature of 25 to 40 mm and preferably about 30 mm such that a sheet, as it is conveyed through said exhaust port, is ascended while being turned by said receptacle so as to direct the front end of the sheet toward the main body and said receptacle supports the sheet stationarily in a curved state by a resilient force of the sheet after the rear end of the sheet has left said exhaust port so as to become free.

* * * * *